United States Patent
Hong et al.

(10) Patent No.: US 11,908,061 B2
(45) Date of Patent: Feb. 20, 2024

(54) INTER-WARP SHARING OF GENERAL PURPOSE REGISTER DATA IN GPU

(71) Applicant: HUAWEI TECHNOLOGIES CO., LTD., Guangdong (CN)

(72) Inventors: Zhou Hong, Cupertino, CA (US); Yufei Zhang, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 17/463,835

(22) Filed: Sep. 1, 2021

(65) Prior Publication Data
US 2021/0398339 A1    Dec. 23, 2021

Related U.S. Application Data

(63) Continuation of application No. PCT/CN2019/090117, filed on Jun. 5, 2019.

(60) Provisional application No. 62/812,407, filed on Mar. 1, 2019.

(51) Int. Cl.
*G06T 15/00* (2011.01)
*G06F 9/30* (2018.01)
*G06T 1/60* (2006.01)

(52) U.S. Cl.
CPC ........ *G06T 15/005* (2013.01); *G06F 9/30101* (2013.01); *G06T 1/60* (2013.01)

(58) Field of Classification Search
CPC ................................. G06T 15/005; G06T 1/60

USPC ........................... 345/501; 712/217; 717/113
See application file for complete search history.

(56) References Cited

U.S. PATENT DOCUMENTS

| | | | |
|---|---|---|---|
| 2006/0095894 A1* | 5/2006 | Wilde | G06F 30/33 717/113 |
| 2014/0047219 A1* | 2/2014 | Gschwind | G06F 9/3012 712/217 |
| 2016/0098276 A1* | 4/2016 | Du | G06F 9/3887 712/217 |
| 2017/0053374 A1* | 2/2017 | Howes | G06F 9/30138 |

\* cited by examiner

*Primary Examiner* — Prabodh M Dharia
(74) *Attorney, Agent, or Firm* — Fish & Richardson P.C.

(57) ABSTRACT

Methodologies and architectures are provided for inter-thread sharing of data in a general purpose register (GPR) of a multiprocessor apparatus. The data sharing is performed by a graphics processing unit (GPU) having at least one processing cluster including a plurality of processing cores (PCs) configured for parallel operation. Each PC of a cluster is configured to utilize a dedicated portion of the GPR. The GPU further includes a shared memory for the cluster, and a memory read/write hub coupled to the GPR and shared memory, the hub including a crossbar switch. A PC executes a move data instruction, including operands referencing a destination portion of the GPR and a source portion assigned to the PC, to retrieve data from the source portion. The memory read/write hub writes the data, via the crossbar switch, to the destination portion of the GPR without first writing the data to the shared memory.

20 Claims, 7 Drawing Sheets

INTER-WARP SHARING OF GENERAL PURPOSE REGISTER DATA IN GPU

CROSS-REFERENCE TO RELATED APPLICATIONS

This application is a continuation of International Application No. PCT/CN2019/090117, filed on Jun. 5, 2019, which claims priority to U.S. Provisional Application No. 62/812,407, filed on Mar. 1, 2019. The disclosures of the aforementioned applications are hereby incorporated herein by reference in their entireties.

TECHNICAL FIELD

The present application relates to multithreaded processing; and, more particularly, to sharing of data in a general purpose register of a multiprocessor apparatus.

BACKGROUND

Due to high throughput and power efficiency, massively parallel multiprocessor architectures such as graphics processing units (GPUs) are becoming an increasingly popular platform for general purpose data-parallel computing applications. With programmable graphics pipelines and widely available software runtime frameworks, GPUs are being applied to many applications previously performed on general-purpose multi-core central processing units (CPUs).

GPUs were originally designed for rendering graphics applications (e.g., animations, games, and video) and generally have thousands of arithmetic logic units (ALUs) as compared to typical CPUs having a relatively small number of ALUs. A GPU achieves performance and energy efficiency (as compared to a CPU) by executing several parallel threads of program code at the same time on streamlined hardware. Accordingly, GPUs are very useful for applications that involve parallel computation, and GPUs are finding applications in many diverse fields such as neural networking, machine learning, bioinformatics, chemistry, finance, electric design automation, imaging and computer vision, medical imaging, genome computations, energy exploration, and weather analysis. GPU architectures continue to evolve to better support such applications.

SUMMARY

The present disclosure provides various aspects that may be employed with one or more of the embodiments. These aspects may be combined with one another singularly, in various combinations, or in total. According to a first embodiment of the present disclosure, a graphics processing unit (GPU) is provided with general purpose register (GPR) data sharing capabilities. The GPU includes at least one processing cluster, including a plurality of processing cores configured for parallel operation, and a GPR, each processing core of the plurality of processing cores configured to utilize a respective dedicated portion of the GPR when processing instructions. The GPU further includes a shared memory for the plurality of processing cores, and a memory read/write hub coupled to the GPR and the shared memory, the memory read/write hub including a crossbar switch.

In this embodiment, the GPU is configured to execute the instructions of an instruction set architecture having a move data instruction including operands that reference a source portion of the GPR and a destination portion of the GPR. Execution of the move data instruction by a processing core of the plurality of processing cores configured to utilize the source portion of the GPR results in retrieving data from the source portion of the GPR. According to this embodiment, the memory read/write hub writes, via the crossbar switch, the retrieved data to the destination portion of the GPR, writing of the retrieved data occurring without first writing the retrieved data to the shared memory.

According to a first aspect of the first embodiment, the processing cluster of the GPU is configured to execute a warp of related threads, wherein each processing core executes a separate thread of the warp of related threads. According to a second aspect of the first embodiment, the move data instruction further includes a warp identifier.

According to a third aspect of the first embodiment, the operands of the move data instruction that reference a source portion of the GPR and a destination portion of the GPR include a register identifier for the source portion of the GPR and a register identifier for the destination portion of the GPR. According to a fourth aspect of the first embodiment, the move data instruction further includes a register size value.

According to a fifth aspect of the first embodiment, execution of the move data instruction further results in sending, by the processing core, the retrieved data, a warp size value, and a per-thread register size value to the memory read/write hub. According to a sixth aspect of the first embodiment, execution of the move data instruction further results in sending, by the processing core, at least one of a destination processing core identifier or a destination register identifier to the memory read/write hub.

According to a seventh aspect of the first embodiment, the source portion of the GPR referenced by the operands of the move data instruction is a subset of the portion of the GPR utilized by the processing core. According to an eighth aspect of the first embodiment, each processing core of the plurality of processing cores comprises an arithmetic logic unit (ALU). According to a ninth aspect of the first embodiment, each processing core of the plurality of processing cores comprises an integer arithmetic logic unit (ALU) and a floating-point ALU.

In a second embodiment of the present disclosure, a method is provided for operating a graphics processing unit (GPU), the GPU including a processing cluster having a plurality of processing cores configured to execute a warp of related threads, each processing core executing a separate thread of the warp in parallel, the GPU further including a shared memory for the processing cluster. In accordance with the method, a processing core of the plurality of processing cores receives a move data instruction of an instruction set architecture of the GPU, the move data instruction including operands that reference a source portion of a general purpose register (GPR) and a destination portion of the GPR, each processing core of the plurality of processing cores configured to utilize a respective dedicated portion of the GPR when processing instructions, wherein the processing core is configured to utilize the source portion of the GPR referenced by the move data instruction.

According to the method, the processing core executes the move data instruction to retrieve data from the source portion of the GPR, and provides the retrieved data to a memory read/write hub coupled to the GPR and the shared memory, the memory read/write hub including a crossbar switch. The memory read/write hub writes, via the crossbar switch, the retrieved data to the destination portion of the GPR, writing of the retrieved data occurring without first writing the retrieved data to the shared memory.

The second embodiment also includes a plurality of aspects that may apply singularly or in combination. According to a first aspect of the second embodiment, the move data instruction further includes a warp identifier. According to a second aspect of the method of the second embodiment, the operands of the move data instruction that reference a source portion of the GPR and a destination portion of the GPR include a register identifier for the source portion of the GPR and a register identifier for the destination portion of the GPR.

According to a third aspect of the second embodiment, the move data instruction further includes a register size value. According to a fourth aspect of the second embodiment, providing the retrieved data to the memory read/write hub further includes providing a warp size value and a per-thread register size value to the memory read/write hub. According to a fifth aspect of the method of the second embodiment, providing the retrieved data to the memory read/write hub further includes providing at least one of a destination processing core identifier or a destination register identifier. According to a sixth aspect of the second embodiment, the source portion of the GPR referenced by the operands of the move data instruction is a subset of the portion of the GPR utilized by the processing core.

A third embodiment is directed to a multiprocessor apparatus. In this embodiment, the multiprocessor apparatus includes a plurality of processing clusters, each of the plurality of processing clusters configured to execute a grouping of related threads in parallel. According to this embodiment, each of the plurality of processing clusters includes a plurality of processing cores and a general purpose register (GPR), each processing core of the plurality of processing cores configured to utilize a respective dedicated portion of the GPR when processing instructions. The multiprocessor apparatus further includes a shared memory for the plurality of processing cores, and a memory read/write hub coupled to the GPR and the shared memory, the memory read/write hub including a crossbar switch.

In this embodiment, the multiprocessor apparatus is configured to execute the instructions of an instruction set architecture having a move data instruction including operands that reference a temporary source register of a processing core and a destination portion of the GPR. Execution of the move data instruction by a processing core of the plurality of processing cores incorporating the temporary source register includes retrieving data from the source temporary register. According to this embodiment, the memory read/write hub writes, via the crossbar switch, the retrieved data to the destination portion of the GPR, writing of the retrieved data occurring without first writing the retrieved data to the shared memory.

The third embodiment includes various aspects that may be applied singularly or in combination. According to a first aspect of the third embodiment, the move data instruction further includes a thread grouping identifier. According to a second aspect of the third embodiment, the operands of the move data instruction that reference a source temporary register and a destination portion of the GPR include a register identifier for the source temporary register and a register identifier for the destination portion of the GPR, and the move data instruction further includes a register size value. The third embodiment can further include additional aspects such as those described above in conjunction with the first embodiment.

The disclosed embodiments enable the transfer of data in a GPR or internal register of a processing core (e.g., an ALU) to be separated from a shared memory path of a multiprocessor apparatus, resulting in improved data transfer speed and a reduction in both the total amount of data moved and power consumption. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
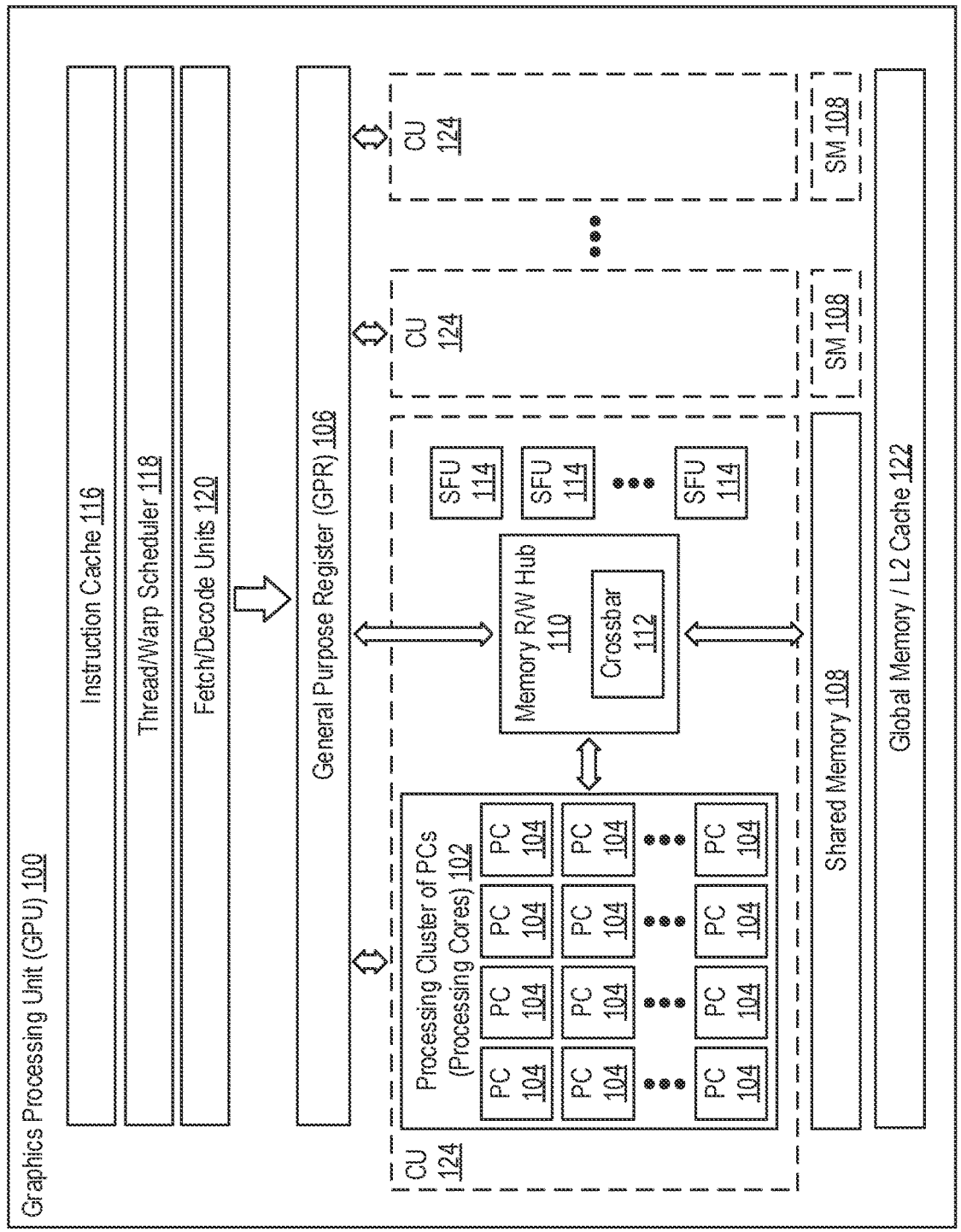
FIG. 1 is a schematic diagram of a graphics processing unit (GPU) in accordance with an embodiment of the present disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A graphics processing unit (GPU) typically includes a plurality of graphics processing clusters for scalability. A processing cluster includes a multitude of processing cores (e.g., arithmetic logic units or "ALUs"). Each processing core is allocated dedicated on-chip memory, known as a general purpose register (GPR), which a processing core can read data from and write data to. The processing cores of a processing cluster typically execute instructions on a per warp basis. Warps, which are sometimes referred to as wavefronts, area grouping of related threads (e.g., 32 or 64 threads) of program code, with each thread of a warp executed in parallel by a respective processing core of a processing cluster. A warp can read data from the GPR in parallel from an offset. The GPR is logically configured such that each thread is allocated a non-overlapping and dedicated portion of the GPR. For example, if the offset is 4 bytes aligned, the 32-bit data per thread from the offset is referred to as a 32-bit register. In contrast to the GPR, a GPU can also contain on-chip shared memory that can be accessed by multiple threads executing on multiple processing cores.

In previous GPUs, if a first processing core such as an ALU requires inter-warp access to data from a second ALU's GPR, the second ALU first writes the data to the shared memory via a shared memory path of the GPU, and the first ALU is notified (e.g., via thread synchronization) of the readiness of the data in the shared memory. The first ALU can then read the data from the shared memory. However, writing and reading data to/from shared memory is generally slower and more expensive than writing and reading data to/from the GPR.

To address such issues, novel methodologies and architectures are introduced below for inter-thread sharing of data in a general purpose register of a multiprocessor apparatus. The mechanisms described herein enable the transfer of GPR data to be separated from a shared memory path of the multiprocessor apparatus, resulting in improved data transfer speed and a reduction in both the total amount of data moved and power consumption.

In described embodiments, such data sharing is performed by a GPU having at least one processing cluster including a plurality of processing cores configured for parallel operation. Each processing core of a processing cluster is configured to utilize a dedicated portion of a general purpose register (GPR). The GPU further includes a shared memory for the plurality of processing cores, and a memory read/write hub coupled to the GPR and the shared memory, the memory read/write hub including a crossbar switch. A processing core of the processing cluster executes a move data instruction including operands that reference a source portion of the GPR assigned to the processing core (or, in the alternative, a temporary register of the processing core) and a destination portion of the GPR, such that the processing core retrieves data from the source portion of the GPR and provides the retrieved data to the memory read/write hub. The memory read/write hub then writes the retrieved data, via the crossbar switch, to the destination portion of the GPR, the writing of the retrieved data occurring without first writing the retrieved data to the shared memory.

Referring now to FIG. 1, a schematic diagram of a GPU 100 in accordance an embodiment of the present disclosure is shown. The illustrated GPU 100 includes one or more processing clusters 102, each processing cluster 102 including a plurality of processing cores (PCs) 104. The GPU 100 further includes a GPR 106, an instruction cache 116, a thread/warp scheduler 118, and a global memory/L2 cache 122 for storing commonly used data. In this embodiment, the processing cores 104 of a processing cluster 102 can read data in parallel from respective dedicated portions of the GPR 106.

In the illustrated embodiment, each processing cluster 102 and associated functionality are arranged as a computing unit (CU) 124. A CU 124 may be alternatively referred to as a single instruction multiple thread (SIMT) core, a single instruction multiple data (SIMD) core, or a streaming multiprocessor (SM). In addition to a processing cluster 102, the illustrated CU 124 includes a memory read/write hub 110 and a plurality of special function units (SFU) 114. Each SFU 114 can execute a transcendental instruction (e.g., sine, cosine, log, reciprocal or square root) per clock. A shared memory 108 is provided for use by the PCs 104 of a given CU 124.

The memory read/write hub 110 of the illustrated embodiment provides communication between the processing cores 104 and various memories, including the GPR 106 and shared memory 108. In one example, the memory read/write hub 110 includes a control table and bit maps (not separately illustrated) for use in data read/write operations. As noted, writing and reading thread data to/from a shared memory 108 is generally slower and consumes more power than writing and reading data to/from a higher bandwidth GPR 106, which is typically located in relatively close proximity to an associated processing cluster 102. Data read/write operations involving the global memory/L2 cache 122 (e.g., via a separate memory controller of the GPU 100) may be even slower.

In the illustrated GPU 100, the memory read/write hub 110 further includes a crossbar switch 112 that, when utilized in conjunction with the novel move data instruction described herein, allows data to be moved directly from a source portion of the GPR 106 to a destination portion of the GPR 106 without first writing the data to the associated shared memory 108. In various embodiments, the source and destination portions of the GPR 106 are allocated for dedicated use by a first and second PCs 104, respectively, of a processing cluster 102. Examples of the novel move data instruction for data sharing in accordance with embodiments of the disclosure are discussed in greater detail below in conjunction with FIGS. 3A and 3B.

The instruction cache 116 is configured to store a program (i.e., a sequence of instructions) for execution by the GPU 100. In various examples, each instruction of a program can be addressed by a unique instruction address value, where instruction address values for later instructions in the sequence of instructions are greater than the instruction address values for prior instructions of the sequence. In some examples, the program instructions can be stored in the instruction cache as (or compiled into) machine-level instructions corresponding to an instruction set architecture (ISA) of the GPU 100. In various embodiments, ISA decoding and/or sequencing can be hardwired in or loaded into the GPU 100.

In general, a program to be executed on a GPU (e.g., a program or function that is separate from host code) is referred to as a "kernel". A GPU kernel is typically compiled into binary code at run time if provided as source code. When executed in a SIMT environment (a variant of SIMD that supports data-dependent control flow), a set of related individual threads are grouped together into a SIMD unit referred to herein as a warp. At a higher level, threads of a kernel can be logically organized into thread blocks. A thread block is a programming abstraction that represents a group of threads that can be executed in parallel. A thread block may be further divided into warps for execution by processing clusters 102, where the number of threads in a warp generally corresponds to the number of PCs 104 of a processing cluster 102 available for parallel execution of an instruction. The threads of a thread block can communicate with each other, for example, via shared memory 108, barrier synchronization, or other synchronization primitives such as atomic operations.

The thread/warp scheduler 118 of the illustrated embodiment is responsible for dispatching threads to the CUs 124 at warp granularity. The fetch/decode units 120 are configured to fetch (retrieve) instructions, e.g., from the instruction cache 116 based on instruction addresses identified by a program counter value stored in a program counter (not separately illustrated). The fetch/decode units 120 further decode retrieved instructions and generate data operand addresses for provision to the GPR 106. Each warp of related threads typically relies on a single program counter, and all threads within the warp share this program counter.

In an example, with one instruction fetch and decode, 32/64 data computations (for example) can be performed in parallel depending on the number of available PCs 104.

While the term "warp" is used herein to generically refer to a grouping of related threads that execute a single instruction over all of the threads at the same time, a warp can also be viewed as the most basic unit of scheduling for a processing cluster. Further, the term warp may be used in certain contexts to refer to a processing cluster and associated hardware that is configured to execute a grouping of related threads in parallel.

Most GPU execution utilizes a single instruction multiple data (SIMD) model, where multiple processing elements/cores perform the same operation on multiple data items concurrently. Although the majority of this disclosure is discussed in the context of GPUs and associated ISAs, many, if not all, of the embodiments disclosed herein can be implemented in SIMD/SIMT processors/cores other than those of a GPU. Further, the described methodologies and architectures can be utilized to perform general purpose computing on Graphics Processing Unit (GPGPU) for applications that may benefit from the high throughput and power efficiency of a GPU implemented in accordance with the present disclosure. For example, deep learning neural network applications typically involve large matrix and vector calculations, and are therefore highly suitable for optimization on GPUs because of the parallel nature of such calculations. A GPU implemented in accordance with the present disclosure can improve the speed and efficiency of execution of these and other types of applications.

Figure 5:
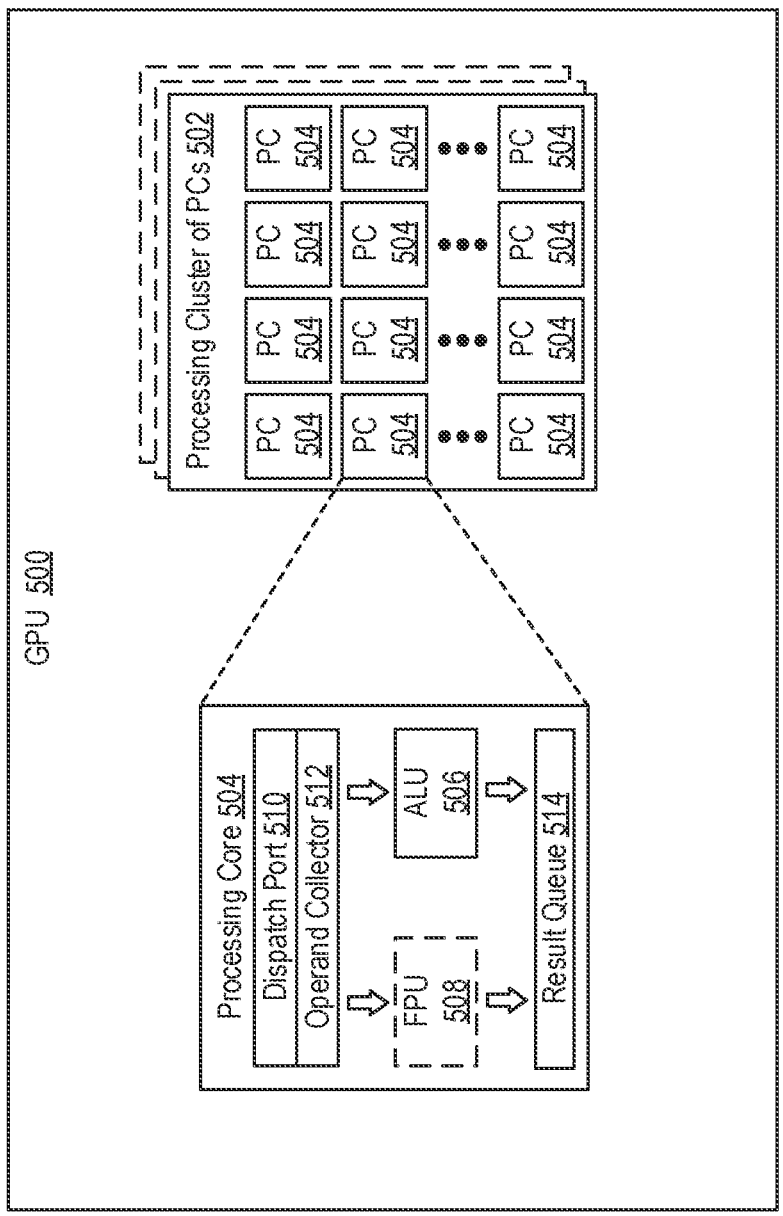
FIG. 5 is a block diagram of a processing core (PC) of a processing cluster of a GPU in accordance with an embodiment of the present disclosure.
Figure 6:
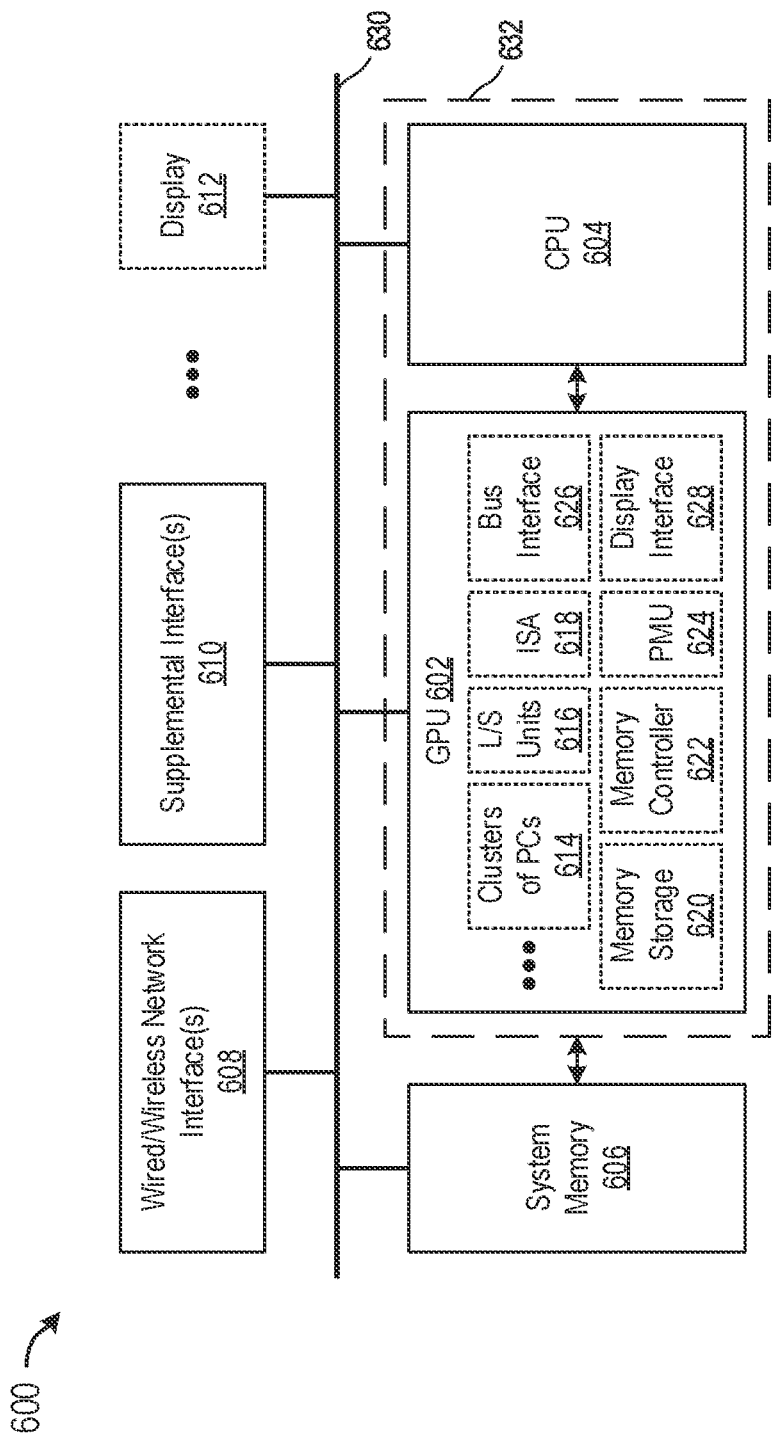
FIG. 6 is a block diagram representation of a processing system implemented in accordance with an embodiment of the present disclosure.

The GPU 100 can implement any of the GPUs 500 or 600 of FIGS. 5 and 6. Although not explicitly illustrated in full, the GPU 100 can incorporate other components, including a power management unit, a bus interface(s), a display interface, a high-level memory controller, etc.

Figure 2:
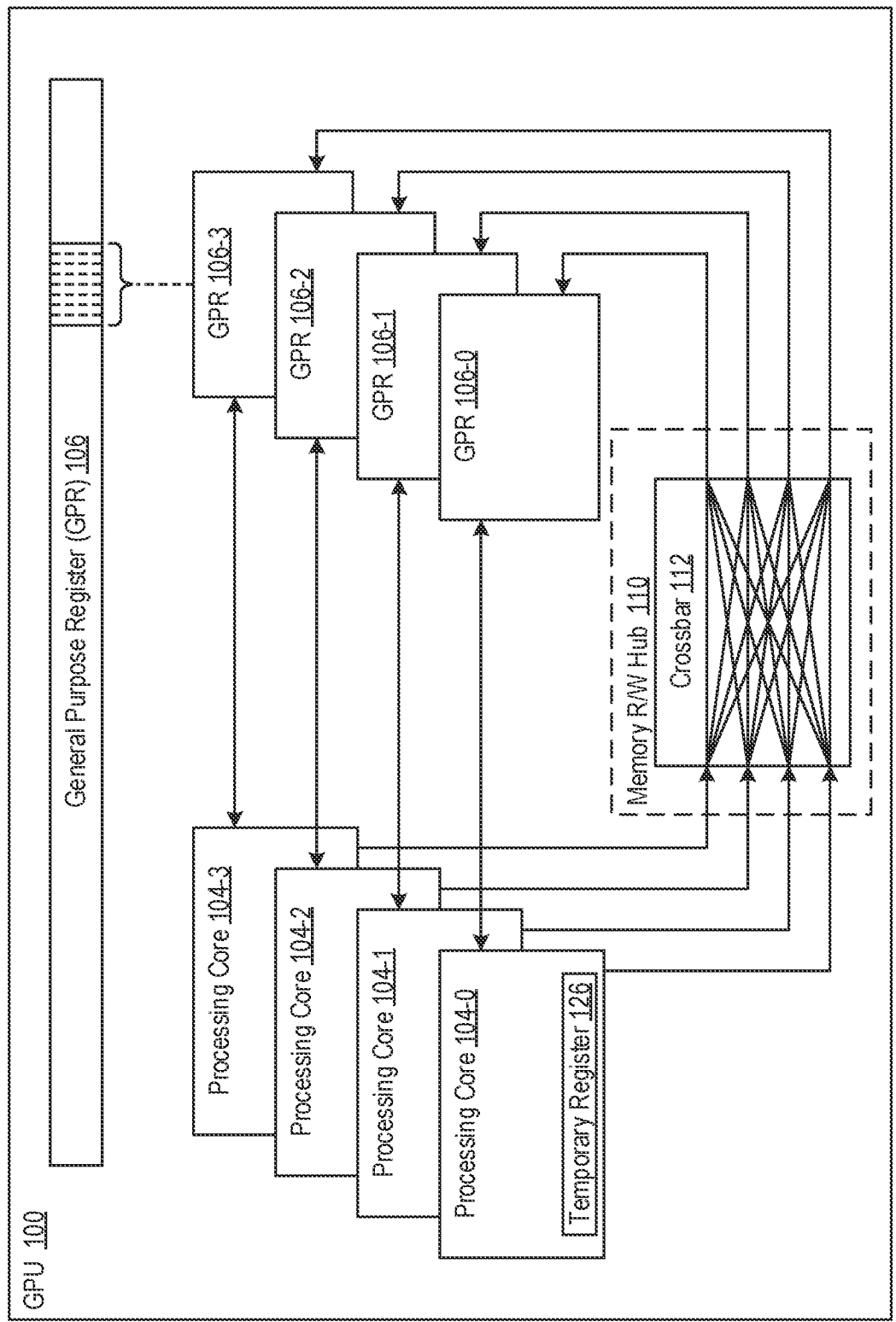
FIG. 2 is a block diagram illustrating data sharing components of a GPU in accordance with an embodiment of the present disclosure.

FIG. 2 is a block diagram illustrating data sharing components of a GPU 100 in accordance with an embodiment of the present disclosure. In the illustrated example (and the examples of FIG. 3A and FIG. 3B), four PCs 104-0, 104-1, 104-2, and 104-3 of a processing cluster 102 are shown for purposes of illustration, although the example is extensible to any number of PCs and warp sizes. Further, while it is assumed in the illustrated example that programs execute one warp per PC, the techniques and architectures described herein can be adapted to support multiple warps in a PC by incorporating warp identifiers (IDs) into the novel move data instruction described in greater detail below. While a PC 104, according to various embodiments, can be configured to execute multiple warps, execution of one warp per PC 104 may be preferred in certain applications such as deep learning neural networking.

Figure 3A:
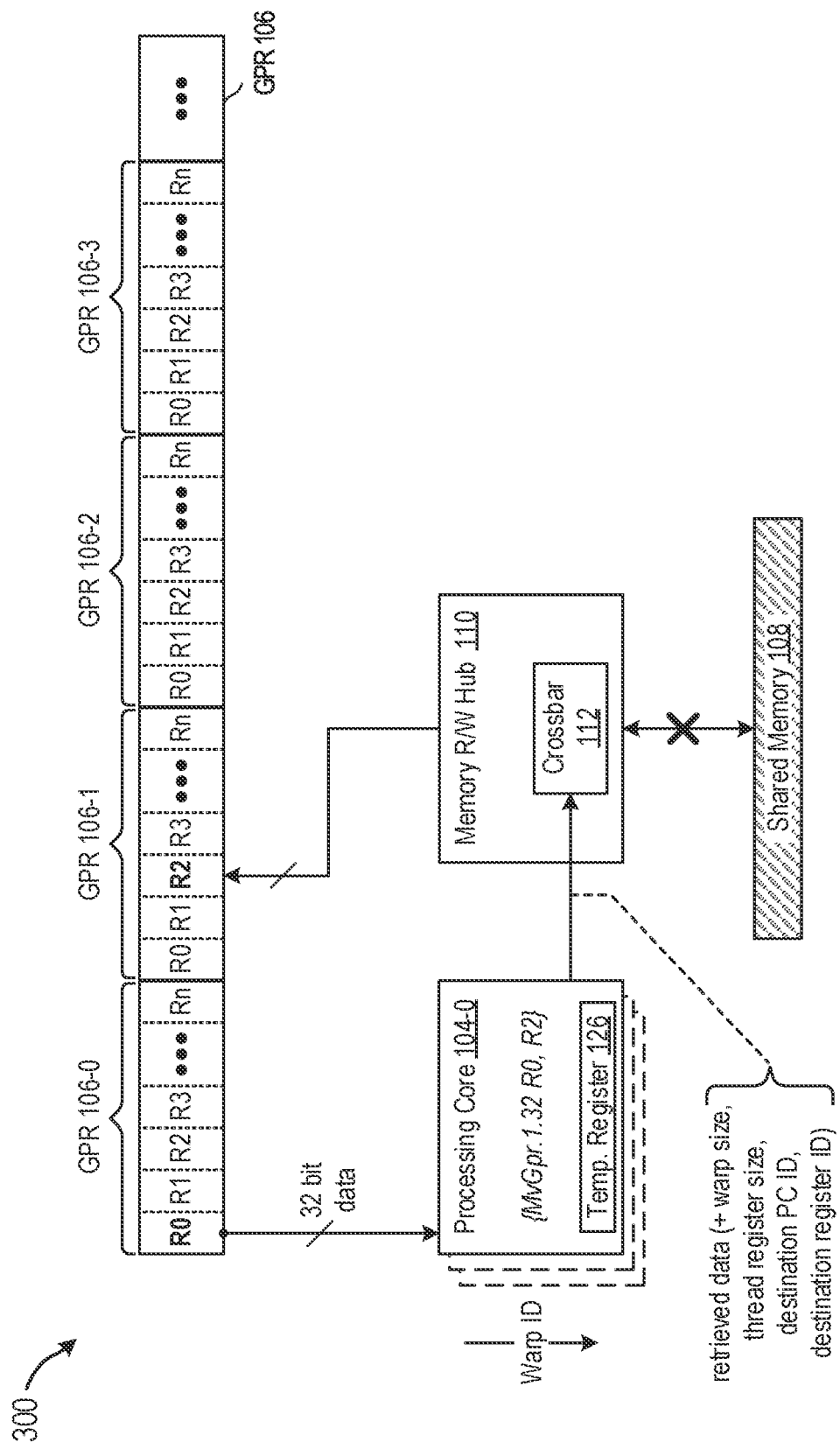
FIG. 3A illustrates an example of data sharing operations in a GPU in accordance with an embodiment of the present disclosure.
Figure 3B:
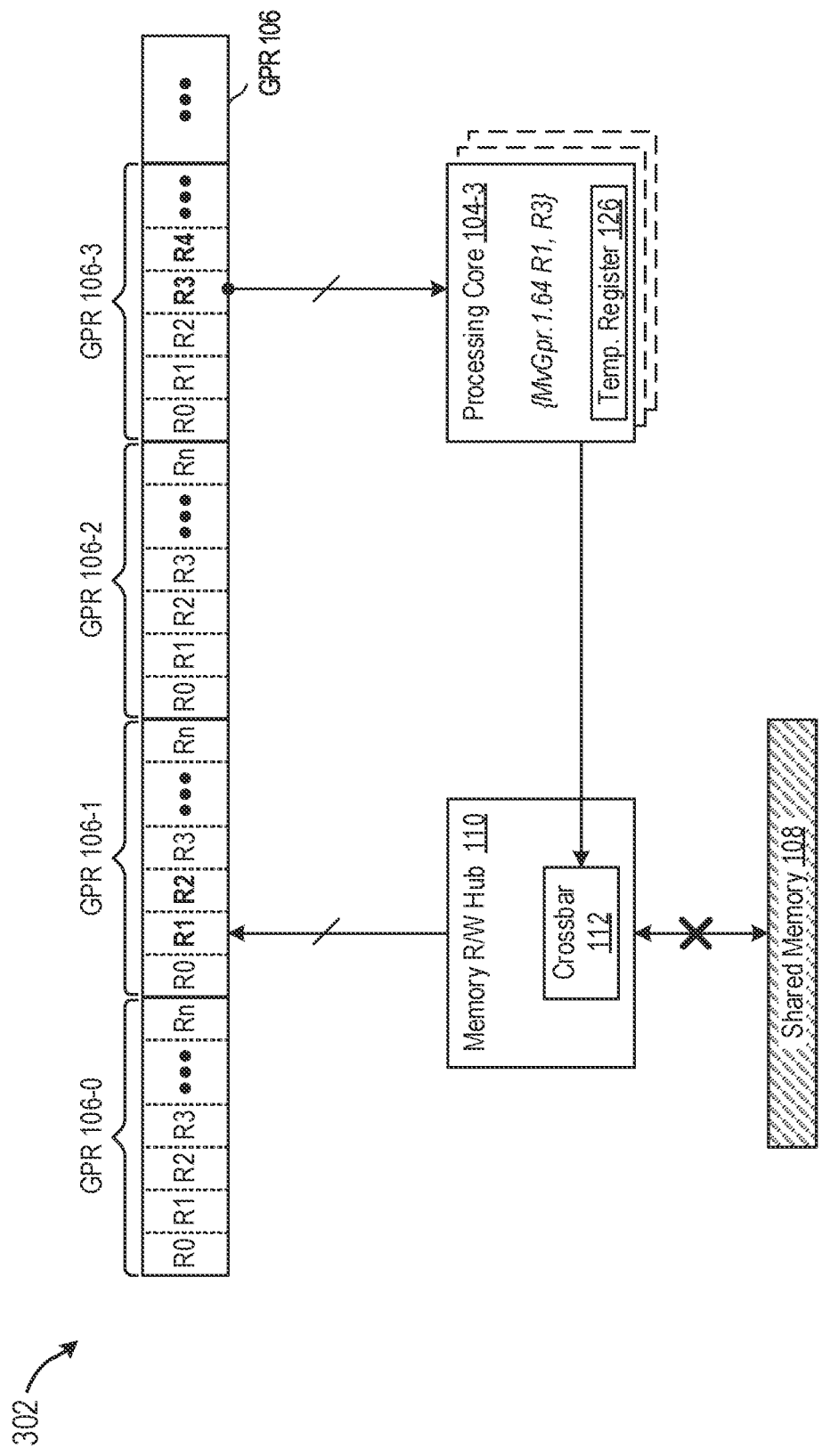
FIG. 3B illustrates another example of data sharing operations in a GPU in accordance with an embodiment of the present disclosure.

In various embodiments, the PCs 104-1-104-4 operate in conjunction with the crossbar switch 112 of a memory read/write hub to implement novel data sharing operations (examples of which are described in conjunction with FIGS. 3A and 3B). In one example, the crossbar switch 112 is a sub-unit of a memory read/write hub 110 that supports the processing cores of a processing cluster (e.g., of a single warp) with respect to a GPR 106 and shared memory (such as shown in FIG. 1). In additional examples, the memory read/write hub 110 supports additional processing clusters and/or further supports additional internal/external memories, such as a level 1 (L1) cache, global cache, etc. In various embodiments, the memory read/write hub 110 includes processing circuitry configured to receive and process data and additional/related information from processing cores of a supported processing cluster, and can additionally determine a number of clocks cycles to utilize for such processing.

The crossbar switch 112 (in conjunction with a move data instruction such as described herein) allows for faster inter-warp writing of data from a source portion of the GPR (or a temporary register 126 of a processing core) to a destination portion of the GPR as compared to prior approaches, including a significant reduction in the number of clock cycles required to achieve desired data movement operations. The crossbar switch 112 can be implemented in a variety of ways. In one non-limiting example, the crossbar switch 112 consists of a set of input amplifiers coupled to a series of conductive traces or bars. A similar set of conductive traces or bars are connected to output amplifiers. At each cross-point where the bars cross, a pass transistor is utilized to connect the bars. When a pass transistor is enabled, a selected input (e.g., selected by an operand of a move data instruction) is connected to a selected output.

In the example of FIG. 2, the crossbar switch 112 is configured to receive data retrieved from the GPR 106 by corresponding PCs 104-1-104-4. The crossbar switch 112 is further configured to write the retrieved data to a specified destination portion of the GPR 106. The GPR 106 can be configured with multiple read/write ports, such that the data transfer bandwidth between PCs 104 and GPR 106 approximates the data transfer bandwidth between the crossbar switch 112 and GPR 106.

FIG. 3A illustrates an example 300 of data sharing operations in a GPU in accordance with an embodiment of the present disclosure. In the illustrated embodiment, GPRs 106-0-106-3 portions of the GPR 106 are allocated to a respective plurality of PCs 104, including PCs 104-0-104-3. Each of the GPRs 106-1-106-3 corresponds to a respective portion of the (unified or separated) GPR 106 memory space and, in the illustrated embodiment, is divided into a series of registers R0-Rn, which in turn can be referenced by an operand of the move data instruction.

In the example of FIG. 3A, a novel move data instruction can be defined as follows (in these examples, a processing core (PC) is referred to as an ALU):

SYNTAX:
MvGpr.n.s dst, src (which is executed to move data from register src of size s in the GPR of a current ALU to register dst of a destination ALU n)

In a first example, execution of which is shown in FIG. 3A, sample code can be written as follows:

```
If (warpID==warp running in ALU 0){
    MvGpr.1.32 R2, R0; // write R0 in ALU 0 GPR into ALU 1 GPR R2
}
```

With reference to FIG. 3A, a PC 104-0 ("ALU 0") receives a compiled instruction corresponding to the first sample code, and executes the instruction to retrieve 32-bit data from register R2 of GPR 106-0 and provide the retrieved data to memory read/write hub 110. In addition to data retrieved from GPR 106, a PC 104 can further provide the memory read/write hub 110 with additional information to support execution of a move data instruction and writing of the retrieved data to the destination portion of the GPR 106. Such information can include, for example, one or more of a warp identifier for the executing warp (thread grouping), a warp size value, a thread register size value, a destination PC identifier (ID), a destination register ID, and a source register ID.

In the illustrated example, the memory read/write hub 110 processes the received data and writes, via the crossbar switch 112, the retrieved 32-bit data to register R2 of GPR 106-1. As described, the crossbar switch 112 enables the memory read/write hub 110 to perform this write operation without first writing the retrieved data to a separate shared memory 108 servicing the plurality of PCs, effectively bypassing the shared memory 108 and thereby reducing the amount of data transferred during the write operation.

Although a two-operand instruction is described, the move data instruction may include a differing number of operands in various embodiments. Further, in some embodiments described herein, the move data instruction is not necessarily limited to use of GPR data for source data. For instance, the move data instruction can be configured with appropriate operands to utilize the output of a PC from execution of a prior instruction (e.g., as stored in a temporary register of a PC), as the source data. In this example, each of the PCs 104-0-104-3 includes a temporary register 126 (e.g., a 32×32 bit register) that can hold results from a prior instruction. Such results are typically either output to a GPR register, or remain in the PC for reuse in a subsequent instruction as source data. When a temporary register 126 is identified by a source operand of the move data instruction, the data stored in the identified temporary register 126 is received by the memory read/write hub 110 as the source data.

FIG. 3B illustrates another example 302 of data sharing operations in a GPU in accordance with an embodiment of the present disclosure. In this second example, which is consistent with the examples of FIG. 3A and FIG. 4, sample code can be written as follows:

```
If (warpID==warp running in ALU 3){
    MvGpr.1.64 R1, R3; // write R3, R4 in ALU 3 GPR into ALU 1 GPR R1, R2
}
```

A PC 104-3 ("ALU 3") receives a compiled instruction corresponding to the second sample code, and executes the instruction to retrieve 64-bit data from (32 bit) registers R3 and R4 of GPR 106-3 and provide the retrieved data to memory read/write hub 110. In the illustrated example, the memory read/write hub 110 processes the received data and writes, via the crossbar switch 112, the retrieved 64-bit data to registers R1 and R2 of GPR 106-1. The crossbar switch 112 enables the memory read/write hub 110 to perform this write operation without first writing the retrieved data to a separate shared memory 108 servicing the plurality of PCs.

Figure 4:
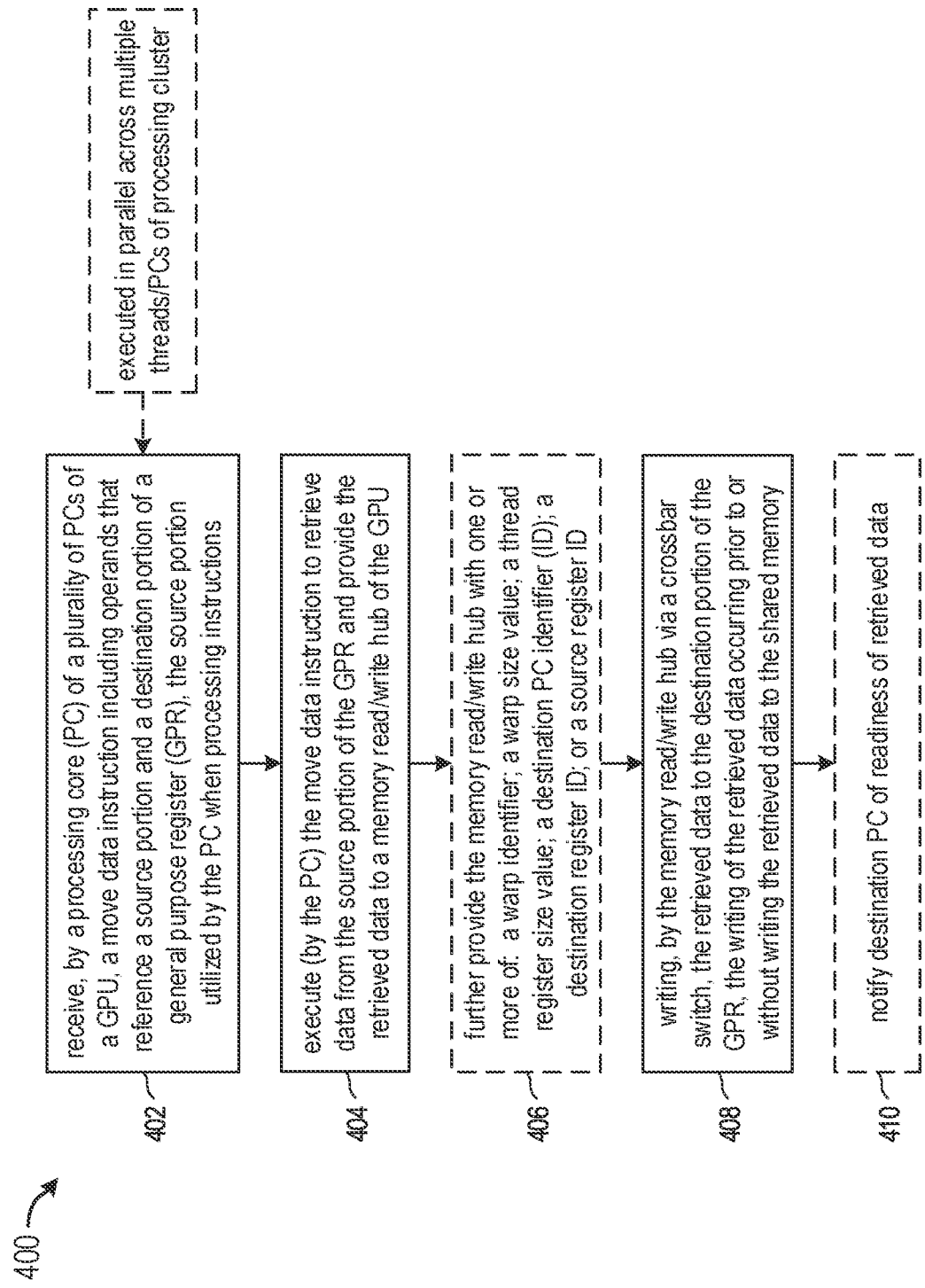
FIG. 4 is a logic diagram illustrating an example of sharing of general purpose register data in a multiprocessor apparatus in accordance with an embodiment of the present disclosure.

FIG. 4 is a logic diagram illustrating example operations 400 for sharing of general purpose register data in a multi-processor apparatus in accordance with an embodiment of the present disclosure. Although the illustrated embodiment shows execution of a move data instruction of a thread, in other examples, the instruction can be executed in parallel across multiple threads/processing cores of a processing cluster.

The illustrated method commences when a processing core (PC) of a plurality of PCs of a GPU (e.g., a processing cluster of PCs) receives a move data instruction including operands that reference a source portion and a destination portion of a general purpose register (GPR) (step 402). In this example, the source portion of the GPR corresponds to a portion of the GPR assigned to the PC executing the instruction. In response, the PC executes the move data instruction to retrieve data from the source portion of the GPR, and provides the retrieved data to a memory read/write hub of the GPU (step 404). The memory read/write hub includes a crossbar switch such as described above in conjunction with FIG. 2. In this example, the PC can further provide the memory read/write hub with additional information to support writing of the retrieved data to the destination portion of the GPR (step 406). Such information can include one or more of a warp identifier for the executing warp, a warp size value, a thread register size value, a destination PC identifier (ID), a destination register ID, and a source register ID.

Operations 400 continue with the memory read/write hub writing, via the crossbar switch, the retrieved data to the destination portion of the GPR (step 408). As described, the crossbar switch enables the memory read/write hub to perform this write operation without first writing the retrieved data to a separate shared memory servicing the plurality of PCs, effectively bypassing the shared memory and thereby reducing the amount of data transferred during the write operation. In one embodiment, the memory read/write hub or other control logic of the GPU further notifies the destination of the readiness of the retrieved data in the destination portion of the GPR (step 410).

FIG. 5 is a block diagram of a processing core (PC) 504 of a processing cluster 502 of a GPU 500 in accordance with an embodiment of the present disclosure. In various embodiments, the PC 504 implements the PCs of FIGS. 1-3B. In the illustrated embodiment, the PC 504 includes an arithmetic logic unit (ALU) 506, a dispatch port 510 and operand collector 512 for receiving dispatched instructions/opcodes and operands for execution by the PC 504, and a result queue 514 (also referred to herein as a temporary register) used to provide calculated or retrieved data to a memory read/write hub. In an example, the PC 504 further includes a floating-point unit (FPU) 508, and the ALU 506 is a scalar ALU.

In the illustrated embodiment, the PCs 504 of the processing cluster 502 are configured to execute a common set of instructions. For example, the PCs 504 can be configured to implement a common instruction set architecture (ISA), including a move data instruction such as described herein. In an example, a PC 504 can perform a variety of arithmetic operations, comparison operations, and logic operations. Such operations can include, for example, an addition operation, a subtraction operation, a multiplication operation, a division operation, a bit-wise AND operation, a bit-wise OR operation, a bit-wise XOR operation, a greater than operation, a less than operation, an equal to zero operation, etc. Operands for such operations can be stored, for example, in a GPR of the GPU 500. Considered individually, the PCs 504 can operate as a single instruction, single data (SISD) processor, while the processing cluster 502 can operate as a single instruction, multiple data (SIMD) processor.

FIG. 6 is a block diagram representation of a processing system 600 implemented in accordance with an embodiment of the present disclosure. The illustrated embodiment includes a GPU 602 and a CPU 604 (either of which can also be referred to as a processing unit, processor, judging unit, determining unit, executing unit, or equivalent terminology referencing a component capable of performing computations and/or other processing related tasks), a system memory 606, wired/wireless network interface(s) 608, supplemental interface(s) 610, and a display 612 (e.g., a display for a laptop, tablet or mobile device) which may or may not be arranged as shown in FIG. 6. Various portions of processing system 600 can be interconnected using communication buses 630 or other types of electrical connections employing various protocols, as well as using any suitable type of communication protocol. Specific processing systems 600 may utilize all of the components shown, additional components, or only a subset of the components, and levels of integration may vary from device to device. Furthermore, the processing system 600 may contain multiple instances of a component, such as multiple GPUs, CPUs, memories, etc.

The GPU 602 can comprise, for example, the GPUs 100 and 500 of FIGS. 1, 2, and 5. The illustrated GPU 602 includes at least one cluster of processing cores 614, L/S units 616 (which permit calculation of source and destination addresses per thread per clock), an instruction set architecture (ISA) 618, memory storage 620, memory controller 622, a power management unit (PMU) 624, a bus interface 626, and a display interface 628. In an example, a memory read/write hub such as described above can be included in the memory controller 622 (or a data manipulator) of the GPU 602.

Some or all of the illustrated components of processing system 600 can be implemented on a single semiconductor substrate (i.e., on the same chip), in assemblies including multiple chips, or some combination thereof. For example, the GPU 602 and CPU 604 can be implemented in a single physical device or processing module 632.

Although illustrated as a single storage, memory storage 620 may be implemented, for example, as a combination of read-only memory (ROM), random access memory (RAM), or secondary storage, and can be implemented at multiple levels for supporting various functions of the GPU 602 architecture. In the illustrated embodiment, the system memory 606 is coupled to the GPU 602 and CPU 604, and stores programming and/or instructions that, when executed by the GPU 602 (e.g., as directed by the CPU 604 via instructions stored in memory storage 620), cause the GPU 602 to perform move data instructions such as described in conjunction with FIGS. 2-4. System memory 606 can include various types of memory circuits, chips, solid-state drives, including but not limited to random access memory (RAM), static RAM (SRAM), dynamic RAM (DRAM), read-only memory (ROM), or electrically erasable programmable read-only memory (EEPROM). The wired/wireless network interface(s) 608 may comprise wired links, such as an Ethernet cable or the like, and/or wireless links to access other devices or nodes via one or more networks and to exchange networking information, data, programming, etc.

It should be understood that software can be installed in and sold with a GPU or like device. Alternatively, the software can be obtained and loaded into the GPU, including obtaining the software through a physical medium or distribution system, including, for example, from a server owned by the software creator or from a server not owned but used by the software creator. The software can be stored on a server for distribution over the Internet, for example.

As may be used herein, the term "non-transitory computer-readable media" includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form of a solid-state memory, a hard drive memory, cloud/networked memory, a thumb drive, server memory, a computing device memory, and/or other physical medium for storing digital information. The terms "computer-readable media" and "computer-readable medium" do not include carrier waves to the extent that carrier waves are deemed too transitory.

As may also be used herein, the terms "processing circuitry," "processing circuit," "processor," and/or "processing unit" or their equivalents (such as identified above) may be a single processing device or a plurality of processing devices. Such a processing device may be a microprocessor, micro-controller, digital signal processor, microcomputer, central processing unit, field-programmable gate array, programmable logic device, state machine, logic circuitry, analog circuitry, digital circuitry, and/or any device that manipulates signals (analog and/or digital) based on hard coding of the circuitry and/or operational instructions. A processor, processing circuitry, processing circuit, and/or processing unit may be, or further include, memory and/or an integrated memory element, which may be a single memory device, a plurality of memory devices, and/or embedded circuitry of another module, processing circuitry, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuitry, processing circuit, and/or processing unit includes more than one processing device, the processing devices may be centrally located (e.g., directly coupled together via a wired and/or wireless bus structure) or may be distributed located (e.g., cloud computing via indirect coupling via a local area network and/or a wide area network). Further note that if the processor, processing circuitry, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the module, processing circuitry, processing circuit, and/or processing unit executes, hard coded, and/or operational instructions corresponding to at least some of the steps and/or functions illustrated in one or more of the Figures. Such a memory device or memory element can be included in an article of manufacture.

One or more embodiments of the disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined if certain significant functions are appropriately performed. Similarly, flow diagram blocks may also have been arbitrarily defined herein to illustrate certain significant functionality. To the extent used, the flow diagram block boundaries and sequence could have been defined otherwise and still perform certain significant functionality. Such alternate definitions of both functional building blocks and flow diagram blocks and sequences are thus within the scope and spirit of the present disclosure. One of average skill in the art will also recognize that the functional building blocks, and other illustrative blocks, modules, and components herein, can be implemented as illustrated or by discrete components, application-specific integrated circuits, processing circuitries, processors executing appropriate software, and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc., described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A graphics processing unit (GPU) comprising:
a general purpose register (GPR);
a processing cluster comprising a plurality of processing cores configured for parallel operation, wherein each processing core of the plurality of processing cores is configured to utilize a respective dedicated portion of the GPR when processing instructions;
a shared memory for the plurality of processing cores; and
a memory read/write hub coupled to the GPR and the shared memory, the memory read/write hub comprising a crossbar switch,
wherein the GPU is configured to execute instructions of an instruction set architecture, wherein the instructions of the instruction set architecture comprise a move data instruction that comprises operands that reference a source portion of the GPR and a destination portion of the GPR; and
in response to execution of the move data instruction:
a processing core of the plurality of processing cores is configured to retrieve data from the source portion of the GPR; and
the memory read/write hub is configured to write, via the crossbar switch, the retrieved data to the destination portion of the GPR, the writing of the retrieved data occurring without first writing the retrieved data to the shared memory.

2. The GPU of claim 1, wherein the processing cluster is configured to execute a warp of related threads, each processing core of the plurality of processing cores executing a separate thread of the warp of related threads.

3. The GPU of claim 1, wherein the move data instruction further comprises a warp identifier.

4. The GPU of claim 1, wherein the operands that reference the source portion of the GPR and the destination portion of the GPR comprise a register identifier for the source portion of the GPR and a register identifier for the destination portion of the GPR.

5. The GPU of claim 1, wherein the move data instruction further comprises a register size value.

6. The GPU of claim 1, wherein in response to the execution of the move data instruction,
the processing core is further configured to send the retrieved data, a warp size value, and a per-thread register size value to the memory read/write hub.

7. The GPU of claim 1, wherein in response to the execution of the move data instruction,
the processing core is further configured to send at least one of a destination processing core identifier or a destination register identifier to the memory read/write hub.

8. The GPU of claim 1, wherein the source portion of the GPR referenced by the operands of the move data instruction is a subset of a respective dedicated portion of the GPR utilized by the processing core.

9. The GPU of claim 1, wherein each processing core of the plurality of processing cores comprises an arithmetic logic unit (ALU).

10. The GPU of claim 1, wherein each processing core of the plurality of processing cores comprises an integer arithmetic logic unit (ALU) and a floating-point ALU.

11. A method for operating a graphics processing unit (GPU), the GPU comprising a processing cluster, the processing cluster comprising a plurality of processing cores configured to execute a warp of related threads, each processing core of the plurality of processing cores executing a separate thread of the warp of related threads in parallel, the GPU further comprising a shared memory for the processing cluster, the method comprising:
receiving, by a processing core of the plurality of processing cores, a move data instruction of an instruction set architecture of the GPU, the move data instruction comprising operands that reference a source portion of a general purpose register (GPR) and a destination portion of the GPR, each processing core of the plurality of processing cores configured to utilize a respective dedicated portion of the GPR when processing instructions, wherein the processing core is configured to utilize the source portion of the GPR referenced by the move data instruction;
executing, by the processing core, the move data instruction to:
retrieve data from the source portion of the GPR; and
provide the retrieved data to a memory read/write hub, the memory read/write hub coupled to the GPR and the shared memory, the memory read/write hub comprising a crossbar switch; and
writing, by the memory read/write hub via the crossbar switch, the retrieved data to the destination portion of the GPR, the writing of the retrieved data occurring without first writing the retrieved data to the shared memory.

12. The method of claim 11, wherein the move data instruction further comprises a warp identifier.

13. The method of claim 11, wherein the operands that reference the source portion of the GPR and the destination portion of the GPR comprises a register identifier for the source portion of the GPR and a register identifier for the destination portion of the GPR.

14. The method of claim 11, wherein the move data instruction further comprises a register size value.

15. The method of claim 11, wherein providing the retrieved data to the memory read/write hub further comprises providing a warp size value and a per-thread register size value to the memory read/write hub.

16. The method of claim 11, wherein providing the retrieved data to the memory read/write hub further comprises providing at least one of a destination processing core identifier or a destination register identifier.

17. The method of claim 11, wherein the source portion of the GPR referenced by the operands of the move data instruction is a subset of a respective dedicated portion of the GPR utilized by the processing core.

18. A multiprocessor apparatus comprising:
a plurality of processing clusters, each of the plurality of processing clusters configured to execute a grouping of related threads in parallel, each of the plurality of processing clusters comprising:
a general purpose register (GPR);
a plurality of processing cores, each processing core of the plurality of processing cores comprising a temporary register, wherein each processing core of the plurality of processing cores is configured to utilize a respective dedicated portion of the GPR when processing instructions;
a shared memory for the plurality of processing cores; and
a memory read/write hub coupled to the GPR and the shared memory, the memory read/write hub comprising a crossbar switch,
wherein the multiprocessor apparatus is configured to execute instructions of an instruction set architecture, the instructions of the instruction set architecture comprising a move data instruction comprising operands that reference a source temporary register and a destination portion of the GPR; and
in response to execution of the move data instruction:
a processing core of the plurality of processing cores is configure to retrieve data from the source temporary register; and
the memory read/write hub is configured to write, via the crossbar switch, the retrieved data to the destination portion of the GPR, the writing of the retrieved data occurring without first writing the retrieved data to the shared memory.

19. The multiprocessor apparatus of claim 18, wherein the move data instruction further comprises a thread grouping identifier.

20. The multiprocessor apparatus of claim 18, wherein the operands that reference the source temporary register and the destination portion of the GPR comprise a register identifier for the source temporary register and a register identifier for the destination portion of the GPR, and the move data instruction further comprises a register size value.

* * * * *